April 5, 1949.　　　　R. SHIELDS　　　　2,466,488
WATER HEATER
Filed April 15, 1946
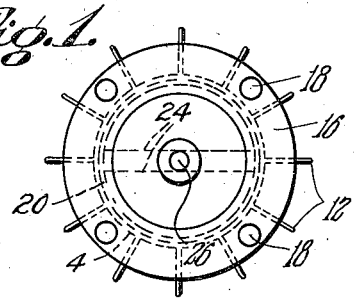
Fig. 1.
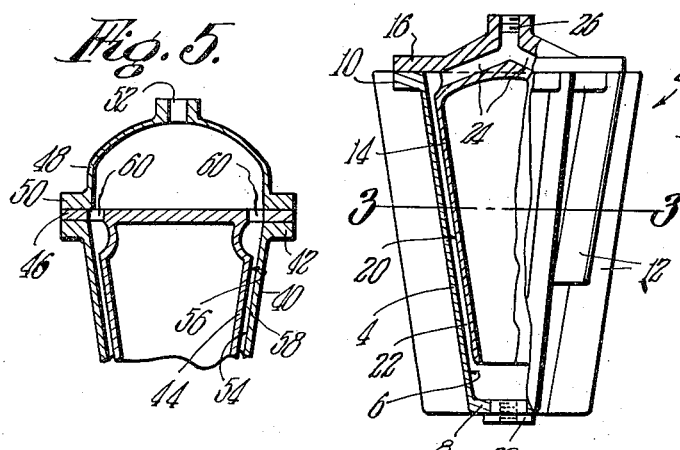
Fig. 5.　　　　Fig. 2.
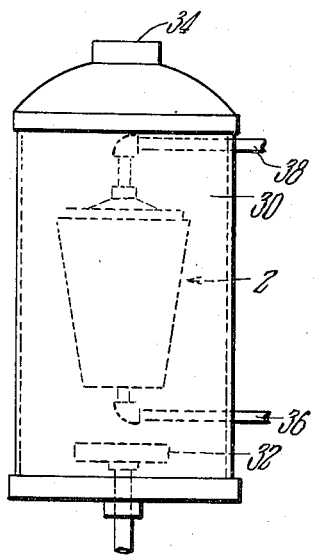
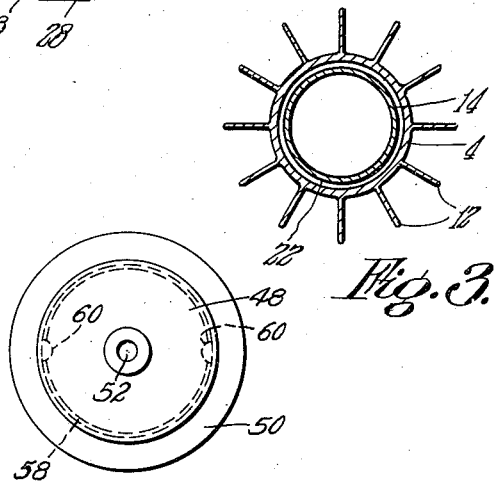
Fig. 3.
Fig. 6.
Fig. 4.
INVENTOR.
Robert Shields.
BY Walter C. Ross.
Attorney.

Patented Apr. 5, 1949

2,466,488

UNITED STATES PATENT OFFICE 2,466,488

WATER HEATER

Robert Shields, Agawam, Mass.

Application April 15, 1946, Serial No. 662,267

2 Claims. (Cl. 257—191)

This invention relates to water heaters and is directed more particularly to a water heater for connecting in a hot water supply system.

The principal objects of the invention are directed to the provision of a water heater which is adapted to be heated by any suitable means and connected in a hot water supply system.

According to special features of the invention, a casing construction is provided which includes outer and inner vertical annular walls which are spaced to provide a relatively narrow annular water space therebetween that is open at the bottom thereof and is in communication with a water inlet while the upper portion of said annular space is in communication with a water outlet.

The vertical walls are preferably arranged as inverted concentrically disposed cones or they converge downwardly from their upper ends to provide an upwardly diverging annular water space. This not only provides outer walls which are readily impinged and wiped by the flame and products of combustion from a burner disposed below the heater to facilitate the most efficient heat transfer but the relatively thin column of water in the water space is readily and easily heated.

The outer wall in order to insure the efficient heating thereof is provided with radially disposed and longitudinally extending fins in the path of the hot gases so as to readily absorb heat.

The heater is simple in form being constructed from a minimum of parts and therefore is economical to produce.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a plan view of a heater embodying the novel features of the invention;

Fig. 2 is a side elevational view of the heater shown in Fig. 1 with parts in section;

Fig. 3 is a sectional plan view on the line 3—3 of Fig. 2;

Fig. 4 is a side elevational view of a housing enclosing the heater shown in Figs. 1 and 2;

Fig. 5 is a sectional view of the upper side of a heater showing a modified form of the invention; and Fig. 6 is a plan view of the heater shown in Fig. 5.

Referring now to the drawings more in detail, the invention will be fully described.

The water heater of the invention is indicated generally by 2 and includes a casing construction having an outer annular wall closed at upper and lower ends with an inner annular wall adjacent and spaced from the outer wall forming therewith a relatively narrow water space therebetween which is open at its lower end while a lower water inlet and an upper water outlet are provided which are in communication with opposite ends of the water space.

According to the preferred form of the invention, the heater is made from secured together parts.

An outer annular wall 4 having an inner face 6 is closed at its lower end by closure means such as a wall 8.

Radially disposed longitudinally extending ribs 12 are provided on the wall 4 and said wall has an upper portion which may be in the form of a flange 10.

An inner annular wall 14 is disposed within the outer wall 4 and has an outer surface 20 which is spaced from the surface 6 to provide an annular water space 22 therebetween.

The wall 14 depends from a flange 16 disposed on and secured to the flange 10 by any suitable means such as bolts or screws 18.

One or more passageways 24 connect the upper portion of the water space 22 to an outlet 26 and a fitting 28 in the lower wall 8 is provided for a pipe connection to a water inlet.

The heater will be disposed in a housing 30 with a burner such as a gas burner 32 therebelow so that hot gases will flow upwardly past the heater so as to heat the wall 4 thereof.

A flue connection is represented by 34 and pipes 36 and 38 extend from the heater 2 for connection to a hot water supply system whereby hot water may flow from the upper side of the heater while cold water enters at the lower side thereof.

The wall 4 preferably converges downwardly from the upper end of the heater so that with the radially disposed ribs a considerable area of surface is presented for heat absorption.

The inner wall 22 is spaced from the outer wall but a small distance so that there is a narrow space for a relative thin annular column of water and by reason of the inverted cone shaped walls the column diverges upwardly for the most efficient heating thereof.

According to the form of the invention shown in Fig. 5, an outer wall 40 similar to the wall 4 has a flange 42 on its upper end and an inner wall 44 like the wall 14 has a flange 46 thereon.

A dome shaped member 48 has a flange 50 disposed on the flange 46 and said flanges 42, 46 and 50 are suitably secured together.

The walls 40 and 44 form a water space similar to the space 22 and passageways 60 connect the water space with a chamber formed by the dome member 48 above the flange 46 which functions as a transverse partition.

A water outlet 52 is provided in the upper end of member 48 and the wall 40 may be provided with ribs similar to the ribs 12.

Altogether the components are formed to present considerable surface areas for heat absorption so that heat is rapidly and efficiently transferred to a thin column of water thereby to heat water efficiently and at low cost.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A water heater construction comprising in combination, an outer casing member having an annular vertical side wall extending downwardly from the upper side thereof arranged in converging relation, an inner member having an annular vertical side wall converging similarly to the side wall of the casing, means connecting the upper sides of said casing and inner member closing the upper ends thereof and provided with an outlet extending upwardly and centrally of the casing, said means positioning the side wall of the inner member concentrically and out of contact with the side wall of the casing providing a relatively narrow vertical unobstructed diverging annular passageway therebetween from the lower to upper side of the wall of the inner member and provided with passageways connecting the outlet with the upper end of said annular passageway, and means connecting the lower ends of the side wall of the casing provided with an outlet, the lower end of the side wall of the inner member being unconnected providing an opening into said member disposed over said inlet.

2. A water heater construction comprising in combination, an outer casing member having an annular vertical side wall extending downwardly from the upper side thereof arranged in converging relation, an inner member having an annular vertical side wall converging similarly to the side wall of the casing, closure means connecting the upper sides of said casing and inner member closing the upper ends thereof and provided with an outlet extending upwardly and centrally of the casing and positioning the side wall of the inner member concentrically and out of contact with the side wall of the casing forming a relatively narrow vertical unobstructed upwardly diverging annular passageway therebetween and provided with passageways connecting the outlet with the upper end of the said annular passageway, and means connecting the lower ends of the side walls of the casing provided with an outlet, the lower ends of the side wall of the inner member being unconnected providing a lower opening disposed over said inlet and leading upwardly into a space within the inner member formed by the side wall thereof and said closure means.

ROBERT SHIELDS.

REFERENCES CITED

The following references are of record in the file of this patent:

UNITED STATES PATENTS

| Number | Name | Date |
|--------|------|------|
| 553,110 | Detwiler | Jan. 14, 1896 |
| 1,802,578 | Schnepp | Apr. 28, 1931 |
| 2,016,746 | Ireland | Oct. 8, 1935 |